United States Patent
Chen et al.

(10) Patent No.: US 7,866,848 B2
(45) Date of Patent: Jan. 11, 2011

(54) ILLUMINATION SYSTEM CAPABLE OF AUTOMATICALLY ADJUSTING ILLUMINATION DIRECTION ACCORDING TO HUMAN BODY'S SIGNAL

(75) Inventors: Pin-Chun Chen, Taipei (TW); Hsi-Ku Tu, Taichung (TW); Shang-Wu Chen, Kinmen County (TW)

(73) Assignee: Edison Opto Corporation, Taipei Hsien (TW)

( * ) Notice: Subject to any disclaimer, the term of this patent is extended or adjusted under 35 U.S.C. 154(b) by 420 days.

(21) Appl. No.: 12/168,420

(22) Filed: Jul. 7, 2008

(65) Prior Publication Data

US 2010/0001654 A1 Jan. 7, 2010

(51) Int. Cl.
*F21V 21/26* (2006.01)
(52) U.S. Cl. .................. 362/286; 362/85; 362/233; 362/272
(58) Field of Classification Search ........... 362/276, 362/233, 259, 85, 272, 286, 287; 315/316, 315/312, 315
See application file for complete search history.

(56) References Cited

U.S. PATENT DOCUMENTS

| 5,550,727 | A | * | 8/1996 | Fenyvesy | 362/386 |
| 6,459,919 | B1 | * | 10/2002 | Lys et al. | 600/407 |
| 7,132,804 | B2 | * | 11/2006 | Lys et al. | 315/292 |
| 7,804,252 | B2 | * | 9/2010 | Chen | 315/152 |
| 2004/0183694 | A1 | * | 9/2004 | Bauer | 340/907 |
| 2010/0060173 | A1 | * | 3/2010 | Scharf | 315/153 |

* cited by examiner

*Primary Examiner*—Ali Alavi
(74) *Attorney, Agent, or Firm*—Rosenberg, Klein & Lee

(57) ABSTRACT

An illumination system comprises an illumination assembly, a human body's signal detecting unit, a processing unit and an illumination direction adjustment unit. The illumination assembly projects an illumination light beam along an illumination direction; the human body's signal detecting unit detects at least one human body's signal released from at least one user to accordingly generate an intensity signal; the processing unit receives the intensity signal and transmits an illumination direction adjustment signal according to the intensity signal; and the illumination direction adjustment unit receives the illumination direction adjustment signal to automatically adjust the illumination direction.

15 Claims, 4 Drawing Sheets

| No. of Illumination Direction | Angular Coordinate | |
|---|---|---|
| | Azimuth Angle | Elevation Angle |
| 0001 | 0° | -90° |
| 0002 | 30° | -50° |
| 0003 | 120° | -70° |
| 0004 | 150° | -60° |
| ⋮ | ⋮ | ⋮ |
| ⋮ | ⋮ | ⋮ |

Remark: The "--" symbol represents that the elevation angle is a depression angle

FIG.4

ILLUMINATION SYSTEM CAPABLE OF AUTOMATICALLY ADJUSTING ILLUMINATION DIRECTION ACCORDING TO HUMAN BODY'S SIGNAL

FIELD OF THE INVENTION

The present invention relates to an illumination system, and more particularly to an illumination system capable of automatically adjusting illumination direction according to human body's signal.

BACKGROUND OF THE INVENTION

In the indoor lighting-design, it is usually necessary to determine the location and the illumination direction of the illumination assembly in accordance with user's habit of use. For example, in a living room, a user usually sits down on a sofa to watch TV program. Therefore, it is usually necessary to install an illumination assembly near the sofa, so as to provide sufficient illumination for the user.

However, once the TV and the sofa are moved to another location different from the original location, it may not provide sufficient illumination for the user any more. If so, the user would need to install another illumination assembly in accordance with the new location where the sofa is located, or the user can remove the original illumination assembly and re-install it in accordance with the location of the sofa.

Following up, for supporting the policy of energy saving, some sensing type illumination systems are presented in public. In these sensing type illumination systems, some sensing members may be installed to sense the user. Thus, when the user moves to a sensing region of the sensing members, the illumination assembly can be automatically turned on to provide illumination to the user. Once, the user moves out of the sensing region of the sensing members, the illumination assembly would automatically turn off. Although that, in the sensing type illumination system, it still cannot change the illumination direction in accordance with the location of the user.

Meanwhile, for meeting the requirements of use, it is necessary to make the illumination assembly be capable of providing illumination along different illumination direction. Thus, a direction steering mechanism is assembled with the illumination system, so that the user can adjust the illumination direction via operating the direction steering mechanism. However, in practice, adjusting illumination direction via manual operation is inconvenient.

Based on above description, the inventor is of the opinion that it is necessary to develop a new illumination system, which can automatically adjust the illumination direction in accordance with the location of the user, so as to meet diverse requirements of illumination.

SUMMARY OF THE INVENTION

In prior arts, the illumination system cannot automatically adjust the illumination direction in accordance with the user's location, so as to cause much inconvenience of use. Therefore, the primary objective of the present invention is to provide a new illumination system, which is capable of automatically adjusting the illumination direction in accordance with human body's signals released from the user.

The secondary objective of the present invention is to provide a new illumination system, which is capable of memorizing the illumination direction and an angular coordinate thereof in accordance with human body's signal released from the user, so that the user can select the illumination direction, which has been automatically memorized previously.

Means of the present invention for solving the problems as mentioned above provides an illumination system which is capable of automatically adjusting the illumination direction. The illumination system comprises an illumination assembly, a human body's signal detecting unit, a processing unit and an illumination direction adjustment unit. The illumination assembly projects an illumination light beam along an illumination direction; the human body's signal detecting unit detects at least one human body's signal released from at least one user to accordingly generate an intensity signal; the processing unit receives the intensity signal and transmits an illumination direction adjustment signal according to the intensity signal; and the illumination direction adjustment unit receives the illumination direction adjustment signal to automatically adjust the illumination direction.

In the preferred embodiment of the present invention, human body's signal can be an infrared signal and/or a sound signal, wherein the infrared signal is generated from heat of human body, and the sound signal is generated from human's sound when speaking, etc. Moreover, the illumination system further comprises a memory unit. When the illumination direction adjustment signal is transmitted, the angular coordinate of the illumination direction intended to be adjusted can be stored in the memory unit. Therefore, the user also can select the illumination direction via the angular coordinate(s) stored in the memory unit. Moreover, when the human body's signal is less than a preset value, the processing unit further can automatically turn off the illumination assembly in accordance with the intensity signal.

Comparing with the illumination system as disclosed in prior arts, in the present invention, the illumination system not only can automatically adjust the illumination direction in accordance with the human body's signal, but also can memorize the illumination direction and the angular coordinate thereof in accordance with the human body's signal. Thus, it is able to obviously increase the overall value of use.

The devices, characteristics, and the preferred embodiment of this invention are described with relative figures as follows.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 4 illustrates the illumination directions and the angular coordinates thereof, which are stored in the memory unit.

DETAILED DESCRIPTION OF THE PREFERRED EMBODIMENTS

The illumination system in accordance with the present invention can automatically adjust the illumination direction, and memorize the illumination direction(s) and the angular coordinate(s) thereof according to the human body's signal released from the user, so that it can be widely applied to many kinds of illumination. Obviously, the combined applications of the present invention are too numerous to be enumerated and described, so that only one preferred embodiment is disclosed as follows for representation.

Figure 1:
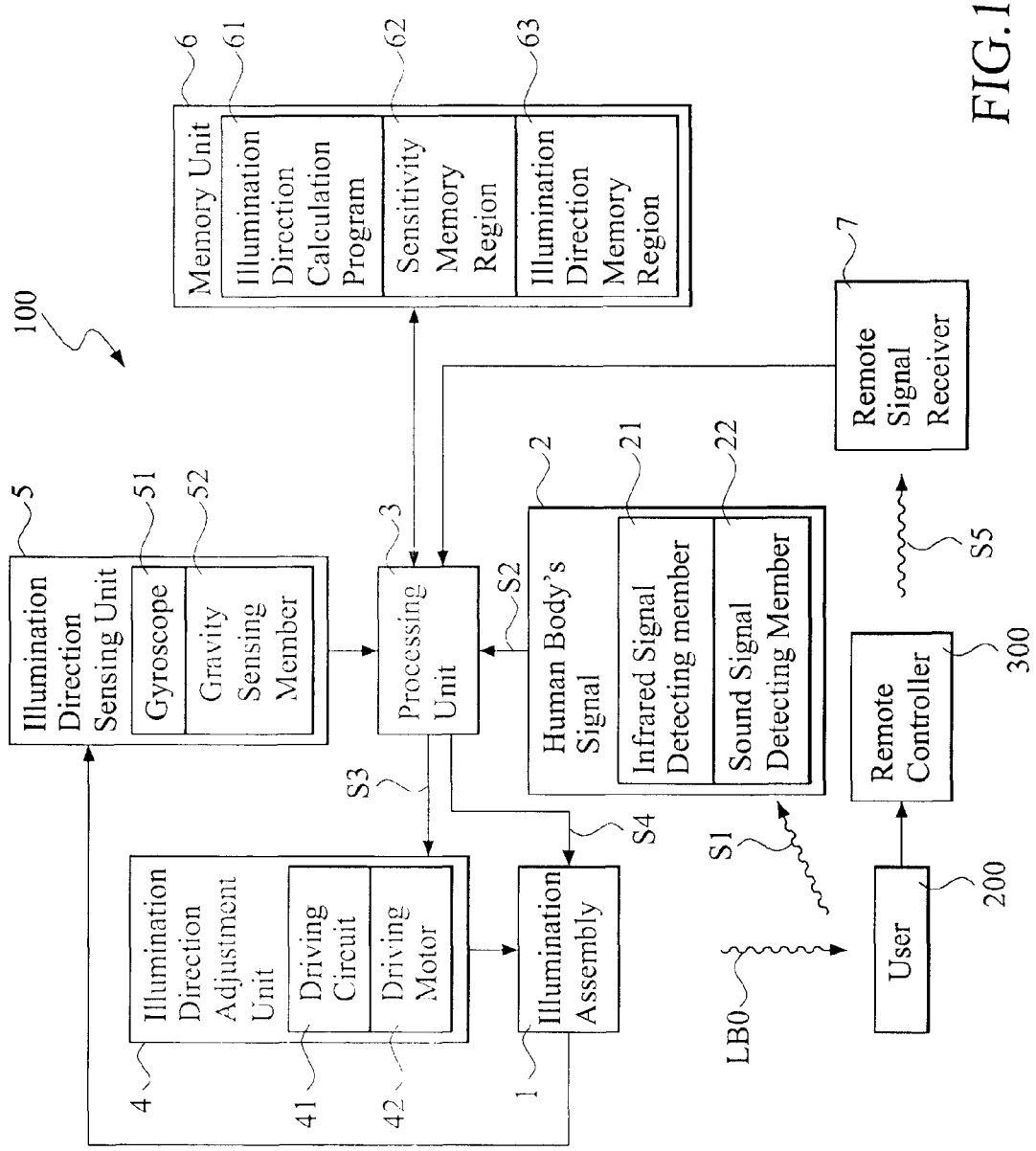
FIG. 1 illustrates a functional block diagram in accordance with a preferred embodiment of the present invention.

Please refer to FIG. 1, which illustrates a functional block diagram in accordance with a preferred embodiment of the present invention. As shown in FIG. 1, an illumination system comprises an illumination assembly 1, a human body's signal detecting unit 2, a processing unit 3, an illumination direction adjustment unit 4, an illumination direction sensing unit 5, a memory unit 6 and a remote signal receiver 7.

The illumination assembly 1 projects an illumination light beam LB0. The human body's signal detecting unit comprises an infrared signal detecting member 21 and a sound signal detecting member 22. The processing unit 3 is electrically connected with the illumination assembly 1 and the human body's signal detecting unit. The illumination direction adjustment unit is connected with the illumination assembly 1, electrically connected with the processing unit 3, and comprises a driving circuit 41 and a driving motor 42. The driving circuit 41 is electrically connected with the processing unit 3 and the driving motor 42, so as to drive the driving motor 42. T he driving motor 42 is connected with the illumination assembly 1.

The illumination direction sensing unit 5 is electrically connected with the illumination assembly 1 and the processing unit, and comprises a gyroscope 51 and a gravity sensing member 52. The memory unit 6 is electrically connected with the processing unit 3, and comprises an illumination direction calculation program 61, a sensitivity memory region 62 and an illumination direction memory region 63. The remote signal receiver 7 is electrically connected with the processing unit 3.

Figure 2:
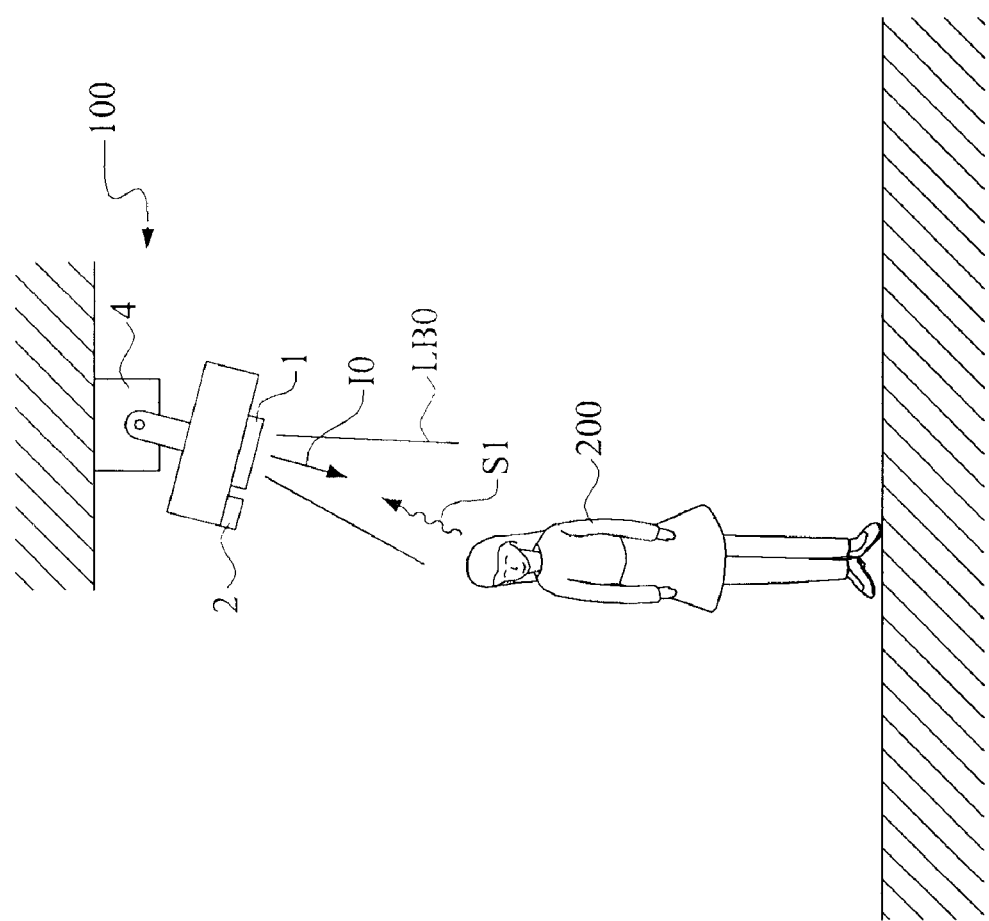
FIG. 2 illustrates that the illumination light beam is projected along an illumination direction toward the user when the user releases the human body's signal.
Figure 3:
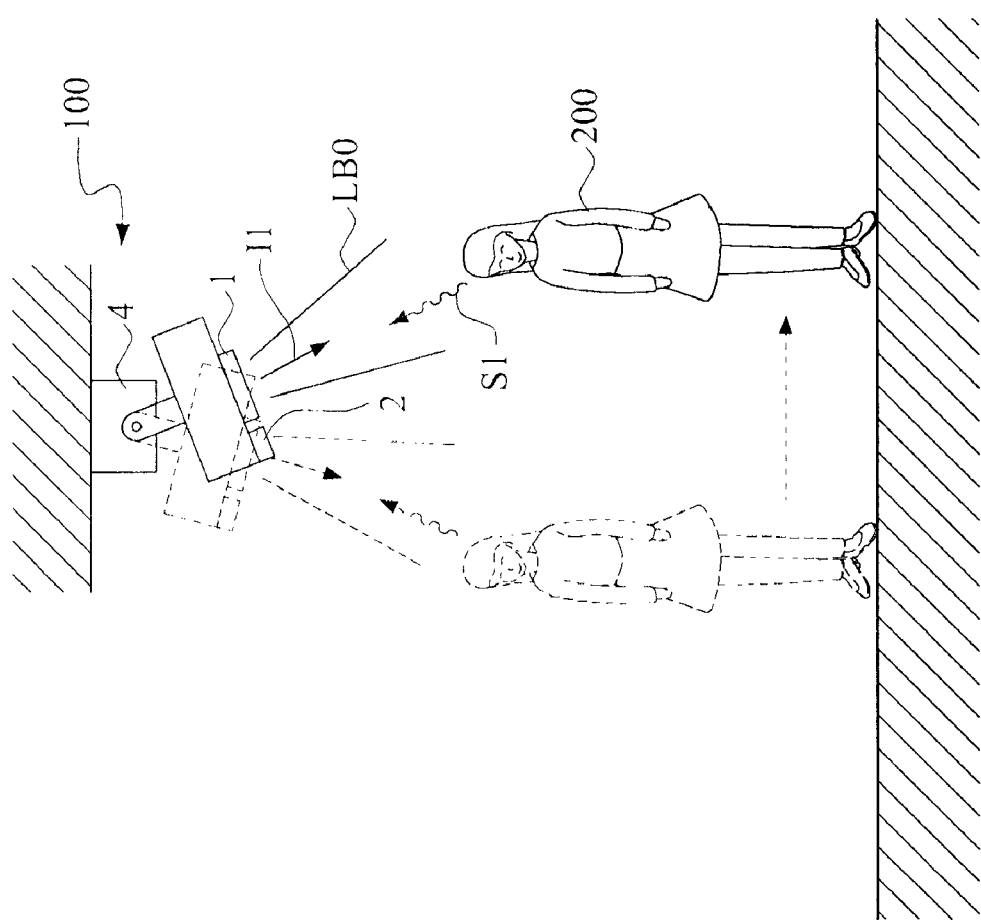
FIG. 3 illustrates that the illumination direction is automatically adjusted to another illumination direction when the user moves to another position.

Please refer to FIG. 2 to FIG. 4, wherein FIG. 2 illustrates that the illumination light beam is projected along an illumination direction toward the user when the user releases the human body's signal; FIG. 3 illustrates that the illumination direction is automatically adjusted to another illumination direction when the user moves to another position; and FIG. 4 illustrates the illumination directions and the angular coordinates thereof, which are memorized in the memory unit. As shown in the drawings, in the preferred embodiment of the present invention, the illumination system 100 can be operated under two modes. One is a full-automatic mode, and the other is a remote control mode.

Under the full-automatic mode, the user 200 can release a human body's signal, and the human body's signal S1 can be an infrared signal and/or a sound signal. The infrared signal is generated form heat of human body, and the sound signal is generated from the user when speaking, etc. When the human body's signal S1 is the infrared signal, it can be detected by the infrared signal detecting member 21 of the human body's signal detecting unit 2; and when the human body's signal S1 is the sound signal, it can be detected by the sound signal detecting member 22 of the human body's signal detecting unit 2. When the human body's signal SI is both the infrared signal and sound signal, it can be detected by both the infrared signal detecting member 21 and the sound signal detecting member 22 of the human body's signal detecting unit 2.

After the human body's signal detecting unit 2 detects the human body's signal S1, it can analyze the intensity of the human body's signal S1 that the human body's signal detecting unit 2 received, so as to accordingly generate an intensity signal S2. Preferably, the infrared signal detecting member 21 an the sound signal detecting member 22 can further comprise a plurality of sensor cells, so as to execute multi-dimensional analysis to make the intensity signal comprises a plurality of intensities of human body's signal detected form different positions.

The intensity signal S2 is transmitted to the processing unit 3, so that the processing unit 3 can analyze the position where the user 200 is located in accordance with the intensity signal S2. Meanwhile, the gyroscope 51 and the gravity sensing member 52 of the illumination direction sensing unit 5 can get an orientation of the illumination assembly 1, i.e., the angular coordinate of the illumination of the illumination direction I0. The angular coordinate includes an azimuth angle and an elevation angle, wherein the azimuth angle is sensed by the gyroscope 51, and the elevation angle is sensed by the gravity sensing member 52. The angular coordinate of the illumination direction I0 sensed by the illumination direction sensing unit 5 can be transmitted to the processing unit 3, or can be transmitted to the memory unit 6 via the processing unit, so as to be registered in (the register of) the processing unit 3 or in the memory unit 6.

Following up, the processing unit 3 downloads the illumination direction calculation program 61 from the memory unit 6 to calculate which direction that the illumination direction shall be adjusted in accordance with the location of the user 200 and the current angular coordinate of the illumination direction, so as to accordingly transmit an illumination direction adjustment signal S3 to the driving circuit 41 of the illumination direction adjustment unit 4. The driving circuit 41 drives the driving motor 42 in accordance with the illumination direction adjustment signal S3, so as to make the driving motor turn the illumination assembly 1 to adjust the illumination in accordance with the illumination direction adjustment signal S3, and further to make the illumination light beam LB0 project along the illumination direction I0 toward the user 200.

Similarly, when the user 200 moves to the location as shown in FIG. 3, the human body's signal detecting unit 2 still can detect the human body's signal S1, and then the intensity signal S2 and the illumination direction adjustment signal S3 can be generated sequentially, so as to make the illumination direction I0 be adjusted to another illumination direction 11.

When the user 200 moves far away from the illumination system 100, the human body's signal S 1 detected by the human body's signal detecting unit 2 becomes more and more indistinct. When the intensity of the human body's signal S1 detected by the human body's signal detecting unit 2 is less than a preset value, the processing unit 3 judges that the user 200 has been out of the illumination region provided by the illumination system 100. At this time, the processing unit 3 transmits a turning-off signal S4 to the illumination, so as to automatically turn off the illumination assembly 1 to interrupt projecting the illumination light beam LB0.

Nevertheless, the user 200 can operate a remote controller 300 to transmit a remote control signal S5, the remote control signal S5 can be transmitted to the processing unit 3 via the remote control signal receiver 7. Therefore, it is able to enter the remote control mode when the user 200 triggers the remote control signal S5.

Under the remote control mode, the user triggers the remote control signal S5 to set the sensitivity that the human body's signal detecting unit 2 detects the human body's signal S1, and to memorize the sensitivity in the sensitivity memory region 62 of the memory unit 6. Meanwhile, alter finish at least one adjustment of the illumination direction, the user 200 can store the angular coordinate(s) of the illumination direction(s) in the illumination direction memory region 63 of the memory region 6 via triggering the remote control signal S5.

As presented in FIG. 4, the illumination direction memory region 63 is stored with a plurality of angular coordinates of the illumination directions. The user 200 can select the number of illumination direction to determine the illumination direction of the illumination light beam LB0. Simultaneously, the processing unit 3 can transmit the illumination direction adjustment signal S3 in accordance with the illumination direction been selected by the user 200, so as to make the illumination light beam LB0 project along the illumination direction selected by the user 200.

In FIG. 4, the number of illumination direction, that the user 200 selects, is 0003. The angular coordinate of the illumination direction is (120°, −70°), which represents that the illumination direction orients to the azimuth angle of 120°, and the elevation angle of −70+, wherein the "−" symbol represents that the elevation angle is a depression angle.

It is believable that any person skilled in ordinary arts can easily realize that in the present invention, the illumination system 100 not only can automatically adjust the illumination direction in accordance with the human body's signal S1 released from the user 200, but also can memorize the illumination direction and the angular coordinate thereof in accordance with the human body's signal S1. Thus, it is able to increase the overall value of use. Furthermore, when the user 200 is the other kinds of animal(s), such as dog, cat, etc., the human body's signal can be replaced by the animal body's signal to go on executing the technology as mentioned, but it is still necessary to execute the remote control mode by human's operation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An illumination system, comprising:
   an illumination assembly projecting an illumination light beam along an
   illumination direction;
   a human body's signal detecting unit for detecting at least one human body's signal released from at least one user to accordingly generate an intensity signal;
   a processing unit electrically connected with the human body's signal detecting unit, receiving the intensity signal, and transmitting an illumination direction adjustment signal according to the intensity signal; and
   an illumination direction adjustment unit connected with the illumination assembly, electrically connected with the processing unit, and receiving the illumination direction adjustment signal to automatically adjust the illumination direction.

2. The illumination system as claimed in claim 1, wherein the human body's signal is an infrared signal released from the user.

3. The illumination system as claimed in claim 2, wherein the human body's signal detecting unit further comprises an infrared signal detecting member.

4. The illumination system as claimed in claim 1, wherein the human body's signal is a sound signal released from the user.

5. The illumination system as claimed in claim 4, wherein the human body's signal detecting unit further comprises a sound signal detecting member.

6. The illumination system as claimed in claim 1, wherein the illumination direction adjustment unit further comprises a driving motor connected to the illumination assembly, so as to turn the illumination assembly in accordance with the illumination direction adjustment signal to adjust the illumination direction.

7. The illumination system as claimed in claim 6, wherein the illumination direction adjustment unit further comprises a driving circuit electrically connected with the processing unit and the driving motor, so as to drive the driving motor.

8. The illumination system as claimed in claim 1, further comprising an illumination direction sensing unit electrically connected with the illumination assembly and the processing unit, so as to sense the illumination direction.

9. The illumination system as claimed in claim 8, wherein the illumination direction sensing unit further comprises a gyroscope, so as to sense an azimuth angle of the illumination direction.

10. The illumination system as claimed in claim 8, wherein the illumination direction sensing unit further comprises a gravity sensing member, so as to sense an elevation angle of the illumination direction.

11. The illumination system as claimed in claim 1, further comprising a memory unit electrically connected with the processing unit.

12. The illumination system as claimed in claim 11, wherein the memory unit further comprises an illumination direction calculation program, so as to calculate an angular coordinate that the illumination direction needs to be adjusted in accordance with the intensity signal.

13. The illumination system as claimed in claim 11, wherein the memory unit further comprises a sensitivity memory region for storing a detecting sensitivity of the human body's signal detecting unit.

14. The illumination system as claimed in claim 11, wherein the memory unit further comprises an illumination direction memory region for storing the angular coordinate of the illumination direction.

15. The illumination system as claimed in claim 1, wherein the illumination assembly is a light emitting diode (LED) illumination assembly.

* * * * *